(12) United States Patent
Russell et al.

(10) Patent No.: US 8,789,190 B2
(45) Date of Patent: Jul. 22, 2014

(54) SYSTEM AND METHOD FOR SCANNING FOR COMPUTER VULNERABILITIES IN A NETWORK ENVIRONMENT

(75) Inventors: Braden Russell, Ladera Ranch, CA (US); Charles Mallabarapu, Laguna Niguel, CA (US); James M. Hugard, IV, Mission Viejo, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/336,891

(22) Filed: Dec. 23, 2011

(65) Prior Publication Data

US 2013/0167238 A1 Jun. 27, 2013

(51) Int. Cl.
*G06F 11/00* (2006.01)

(52) U.S. Cl.
USPC .................. 726/25; 726/22; 726/23; 726/24

(58) Field of Classification Search
USPC .......................................... 726/22, 23, 24, 25
See application file for complete search history.

(56) References Cited

U.S. PATENT DOCUMENTS

| 5,136,711 | A |   | 8/1992  | Hugard et al. |        |
|-----------|---|---|---------|---------------|--------|
| 5,745,669 | A |   | 4/1998  | Hugard et al. |        |
| 5,948,104 | A | * | 9/1999  | Gluck et al.  | 726/24 |
| 5,987,610 | A |   | 11/1999 | Franczek et al. |      |
| 6,073,142 | A |   | 6/2000  | Geiger et al. |        |
| 6,460,050 | B1 |  | 10/2002 | Pace et al.   |        |
| 7,506,155 | B1 |  | 3/2009  | Stewart et al. |       |
| 7,752,667 | B2 | * | 7/2010 | Challener et al. | 726/24 |
| 2003/0212779 | A1 | | 11/2003 | Boyter et al. |       |
| 2003/0217039 | A1 | * | 11/2003 | Kurtz et al. | 707/1 |
| 2004/0088581 | A1 | | 5/2004  | Brawn et al.  |        |
| 2005/0010821 | A1 | | 1/2005  | Cooper et al. |        |
| 2006/0130145 | A1 | | 6/2006  | Choi et al.   |        |
| 2009/0271863 | A1 | | 10/2009 | Govindavajhala et al. | |

OTHER PUBLICATIONS

Information Technology Risk Management, Copyright 2002, © Glen B. Alleman, Niwor, Colorado, 22 pages.
International Search Report and Written Opinion mailed Apr. 16, 2013 for International Application No. PCT/US2012/070419.

* cited by examiner

*Primary Examiner* — Teshome Hailu
(74) *Attorney, Agent, or Firm* — Patent Capital Group (57) ABSTRACT

A method in one embodiment includes identifying a set of known vulnerabilities and a set of new vulnerabilities in an asset, selecting one or more scripts that include checks for vulnerabilities in a union of the set of known vulnerabilities and the set of new vulnerabilities, and using the selected scripts to scan the asset. Known vulnerabilities and new vulnerabilities may be identified by accessing results of previous scans on the asset. The method may also include identifying a plurality of assets to scan in a network, identifying a plurality of sets of known vulnerabilities and a plurality of sets of new vulnerabilities in substantially all assets in the plurality of assets, and inserting checks for vulnerabilities included in a union of the plurality of sets of known vulnerabilities and the plurality of sets of new vulnerabilities into the selected scripts.

18 Claims, 5 Drawing Sheets

SYSTEM AND METHOD FOR SCANNING FOR COMPUTER VULNERABILITIES IN A NETWORK ENVIRONMENT

TECHNICAL FIELD

This disclosure relates in general to the field of computer networks and, more particularly, to a system and a method for scanning for computer vulnerabilities in a network environment.

BACKGROUND

The field of computer network administration and support has become increasingly important and complicated in today's society. Computer network environments are configured for virtually every enterprise or organization, typically with multiple interconnected computers (e.g., end user computers, laptops, servers, printing devices, etc.). In many such enterprises, Information Technology (IT) administrators may be tasked with maintenance and control of the network environment, including executable software files on hosts, servers, and other network computers. As the number of executable software files in a network environment increases, the ability to control, maintain, and remediate these files efficiently can become more difficult. Generally, greater diversity of software implemented in various computers of a network translates into greater difficulty in managing such software. In addition, IT administrators and other users may want to use efficient computer scanning methods to identify and remove vulnerabilities quickly and effectively. When networks have hundreds to millions of nodes, scanning all the nodes for many possible vulnerabilities presents challenges to IT administrators. In many cases, IT administrators may have to upwards of 30,000 vulnerability checks covering thousands of applications and operating systems, with the number of new checks steadily increasing with the discovery of new threats and vulnerabilities within computing systems. Thus, innovative tools are needed to assist IT administrators in the effective control and management of executable software files and computer scan methods on computers within computer network environments.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in one embodiment includes identifying a set of known vulnerabilities and a set of new vulnerabilities in an asset, selecting one or more scripts comprising checks for vulnerabilities included in a union of the set of known vulnerabilities and the set of new vulnerabilities, and using the selected scripts to scan the asset. In some embodiments, the selected scripts may disregard vulnerabilities that have been previously tested and known not to exist in the asset.

In specific embodiments, the method includes accessing results of previous scans on the asset, where the results may indicate the known vulnerabilities. The method may also include accessing results of previous scans on the asset, where the results indicate a set of scanned vulnerabilities, and determining vulnerabilities included in a universal set of vulnerabilities in a computer system that are not in the set of scanned vulnerabilities.

In yet other embodiments, the method includes identifying a plurality of assets to scan in a network, identifying a plurality of sets of known vulnerabilities and a plurality of sets of new vulnerabilities in substantially all assets in the plurality of assets, and inserting checks for vulnerabilities included in a union of the plurality of sets of known vulnerabilities and the plurality of sets of new vulnerabilities into the selected scripts. In more specific embodiments, the selected scripts may be used to scan the plurality of assets and includes other features.

Example Embodiments

Figure 1:
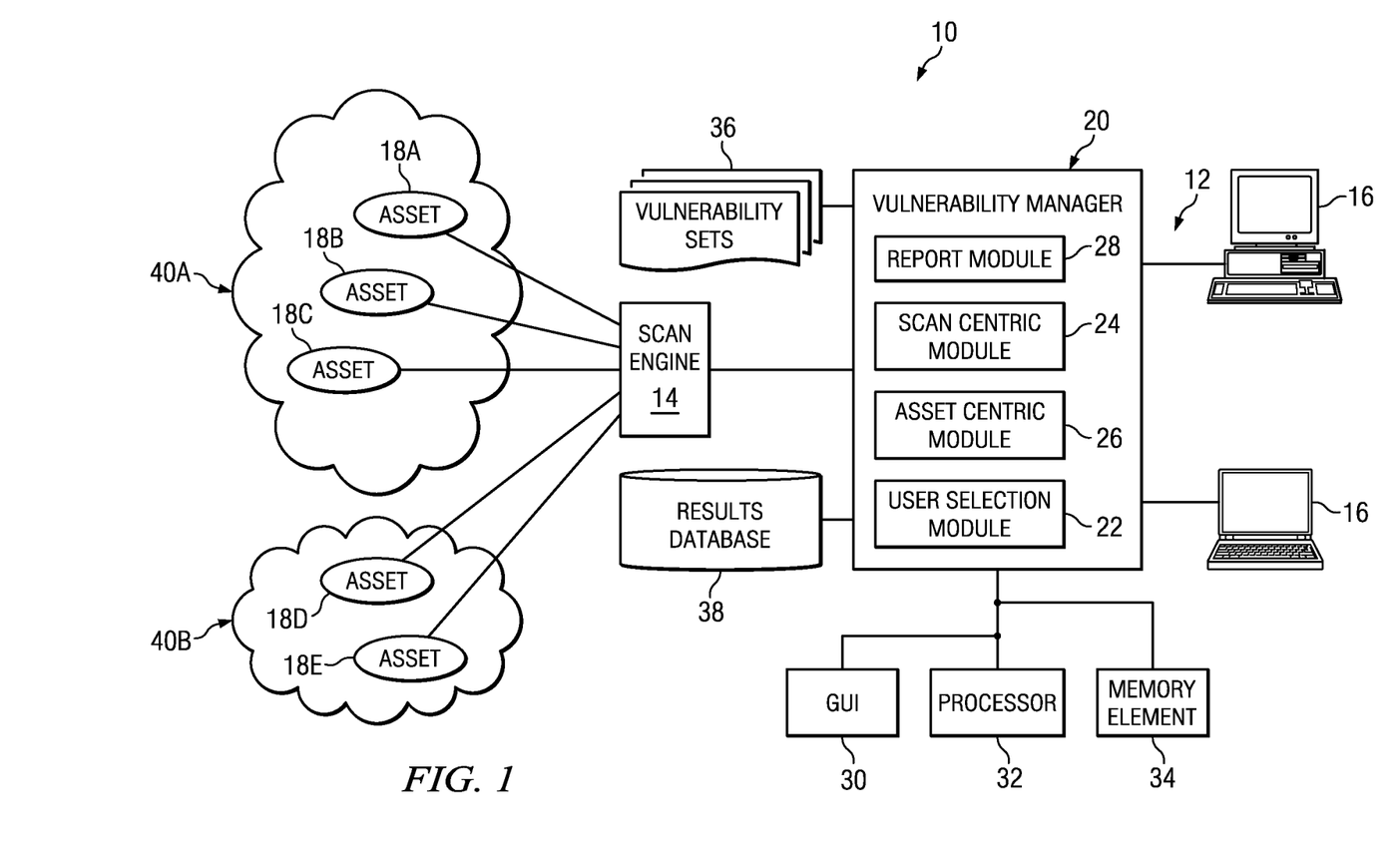
FIG. 1 is a simplified block diagram of an exemplary embodiment of a system for scanning for computer vulnerabilities in a network environment.

FIG. 1 is a simplified block diagram illustrating an example embodiment of a system 10 for scanning for computer vulnerabilities in a network environment. The exemplary network environment illustrates a network 12 comprising one or more scan engines 14 suitably connected to users 16 and configured to scan various assets 18A-E. An "asset" may be any electronic device, network element, mobile device, end-user computer, desktop, laptop, client, server, peer, service, application, or other object capable of sending, receiving, or forwarding information over communications channels in a network. A vulnerability manager 20 is coupled to scan engine 14 and is configured to permit users 16 to design and execute customized scans on the various assets and obtain reports from the scans.

Vulnerability manager 20 comprises a user selection module 22, a scan centric module 24, an asset centric module 26, and a report module 28. A graphical user interface (GUI) 30, one or more processors 32 and one or more memory elements 34 can be accessed within, or by, vulnerability manager 20. Vulnerability manager 20 has access to vulnerability sets 36, comprising a list of vulnerabilities, and a results database 38 comprising results of previous scans run on assets 18A-E. In the embodiment illustrated in FIG. 1, assets 18A-E may be located on separate networks 40A and 40B. In other embodiments, assets 18A-E may be located on the same network, or on multiple different networks.

Vulnerability sets 36 may include a universal set of vulnerabilities that may exist in any computer system (e.g., individual asset, or group of assets, for example, in a network). As used herein, the term "vulnerability" encompasses any flaw, condition, security risk, or weakness in a system (e.g., hardware or software in an asset, including operating systems, applications, files, chipsets, hardware-implemented computing logic, etc.) that could result in unauthorized access to the system and a possible security breach or a violation of the system's security policy, organization standards, industry standards, government standards, or the like. Vulnerabilities can exist, for example, in system security procedures, system designs, operating systems, open ports, internal controls, hardware configurations, etc. that could be exercised (accidentally triggered or intentionally exploited) and that could result in such breaches or violations. Examples of vulnerabilities include CVE-2011-2460, which is a flaw in Adobe Flash Player that allows attackers to execute arbitrary code or cause denial of service via unspecified vectors; CVE-2011-2016, which is an untrusted search path vulnerability in Windows Mail that allows local user to gain privileges via a Trojan horse DLL in a working directory, etc. Vulnerability sets 36 may include vulnerabilities identified by code names (e.g., CVE-2011-4434), keywords (e.g., Windows Server 2008), or other identifying parameters. According to embodiments of the present disclosure, vulnerability sets 36 is configured to be searchable (e.g., query search, text search, etc.), for example, by vulnerability manager 20. Vulnerability sets 36 may be stored in any suitable database, server, hard disk, etc. based on particular needs.

As used herein, a scan can include an execution of a script, which checks for vulnerabilities in an asset. When an asset is scanned, the script identifies vulnerabilities in the asset. According to embodiments of system 10, one or more assets may be scanned simultaneously. In one embodiment, a script may check for only one vulnerability from vulnerability sets 36. In other embodiments, a script may include more than one vulnerability from vulnerability sets 36. When a specific vulnerability is included in the script, the results of the scan on an asset may indicate whether the specific vulnerability is present in the asset.

In some instances, scans, and their associated scripts, can be configured to simulate interactions with particular digital resources, programs, etc. associated with the scanned asset. For example, a scan can simulate an attempt by a user (such as a hacker, malicious or negligent internal user, etc.) or system (such as malware, an application, client systems, etc.) to change particular sensitive data; load or install particular types of programs such as malware, applications, or other software onto the scanned system; gain access to sensitive data structures, networks, or other system components and assets to which the user/system would otherwise be unauthorized to access; circumvent particular system countermeasures and protections in place on the system (e.g., firewalls, anti-malware programs, policy enforcement tools, etc.); among other examples. Upon attempting to perform such activities, the scan can further identify the results of the attempt and report the results to the vulnerability manager. In other examples, scanners can (passively and actively) monitor and otherwise scan assets to identify configurations of assets to identify vulnerabilities likely affecting the assets (e.g., based on the identified asset configurations).

In general, results from scans can indicate "scanned vulnerabilities," which encompass vulnerabilities for which the asset has been scanned; and "known vulnerabilities," which encompass vulnerabilities that have been found in the asset during the scan. Assume, for the sake of illustration, that the universal set of vulnerabilities in vulnerabilities sets 36 is denoted by set U, the set of scanned vulnerabilities in the asset is denoted by set S and the set of known vulnerabilities is denoted by set K. Thus, known vulnerabilities (K) may be a subset of scanned vulnerabilities in the asset (S), which may be a subset of the universal set of vulnerabilities in vulnerability sets 36 (U):

$$K \subseteq S \subseteq U$$

As noted above, scan engine 14 may scan assets 18A-E and return the results to vulnerability manager 20 and results database 38. Reports of results may be generated by report module 28 as appropriate and based on particular needs. Results database 38 comprises a database or equivalent data storage mechanism for storing results from scans on assets in system 10. In an example embodiment, results database 38 may be searchable, for example, by a query search, text search, etc. Results database 38 may be searchable by asset (e.g., IP address), vulnerability (e.g., vulnerability ID), known vulnerabilities, scanned vulnerabilities, etc. Results database 38 may be located on the same device as vulnerability manager 20, or it may be located remotely, and accessed by vulnerability manager 20 over a network as needed.

In an example embodiment, through user selection module 22, user 16 may elect to scan asset 18A. The user's selection triggers asset centric module 26, which may access results database 38 to determine known vulnerabilities in asset 18A. Asset centric module 26 may access results database 38 and vulnerability sets 36 to determine "new vulnerabilities" (i.e., vulnerabilities for which the asset has not been previously scanned). In an example embodiment, asset centric module 26 may compare scanned vulnerabilities in asset 18A with vulnerability set 36). The vulnerabilities included in vulnerability set 26 that are not included in the scanned vulnerabilities comprise the new vulnerabilities. Assume, for the sake of illustration, that the universal set of vulnerability set 36 is denoted by set U, and set of scanned vulnerabilities is denoted by set K, then new vulnerabilities, denoted by set N, may be determined according to the following equation:

$$N = S^c = U \setminus S = \{x : x \in U | x \notin S\}$$

Thus, any vulnerability x in the set of new vulnerabilities may belong the universal set of vulnerabilities in vulnerability sets 36, but may not belong to the set of scanned vulnerabilities. In an example embodiment, new vulnerabilities may comprise vulnerabilities added to vulnerability set 36 between a previous scan of assets 18A-E, and a current scan.

In one embodiment, asset centric module 26 may select one or more scripts that include checks for the known vulnerabilities and the new vulnerabilities. In another embodiment, asset centric module 26 may generate one or more scripts to check for the known vulnerabilities and the new vulnerabilities. Scan engine 14 may cause the selected scripts to be run on asset 18A, and return the results to vulnerability manager 20. Vulnerability manager 20 may cause the results to be populated into results database 38 (for example, if scan engine 14 fails to return the results to results database 38), and report module 28 may generate a suitable report, if needed.

In another example, through user selection module 22, user 16 may elect to scan network 40A. The user's selection triggers scan centric module 24, which may identify the assets in network 40A, namely, assets 18A-C. Scan centric module 24 may access results database 38 to determine known vulnerabilities in assets 18A-C in network 40A. Scan centric module 24 may also access vulnerability sets 36 to determine new vulnerabilities with respect to assets 18A-C in network 40A. In one embodiment, scan centric module 24 may select one or more scripts that include checks for the known vulnerabilities and the new vulnerabilities. In another embodiment, scan centric module 24 may generate one or more scripts to check for the known vulnerabilities and the new vulnerabilities. Scan engine 14 may cause the selected scripts to be run on all assets 18A-C in network 40A, and return the results to vulnerability manager 20 and/or results database 38. Vulnerability manager 20 may cause the results to be populated into results database 38, and report module 28 may generate a suitable report, if needed.

The network environment illustrated in FIG. 1 may be generally configured or arranged to represent any communication architecture capable of electronically exchanging packets. In addition, network 12 may also be configured to exchange packets with other networks such as, for example, the Internet, or other LANs. Other common network elements (e.g., email gateways, web gateways, routers, switches, load-balancers, firewalls, etc.), may also be provisioned in network 12 where appropriate and based on particular needs.

For purposes of illustrating the techniques of system 10, it is important to understand the activities and security concerns that may be present in a given network such as the network shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications. In addition, it will be appreciated that the broad scope of this disclosure intends for references to "scripts" to encompass any software file comprising instructions that can be understood and processed on a computer such as, for example, scans, report templates, executable files, library modules, object files, other executable modules, script files, interpreter files, and the like.

Typical network environments, both in organizations (e.g., businesses, schools, government organizations, etc.) and in homes, include a plurality of computers such as end user desktops, laptops, servers, network appliances, and the like, with each computer having an installed set of executable software. In large organizations, network environments may include hundreds or thousands of computers, which can span different buildings, cities, and/or geographical areas around the world. IT administrators are often tasked with the extraordinary responsibility of maintaining these computers and their software in a way that minimizes or eliminates disruption to the organization's activities.

One difficulty IT administrators face when managing a network environment is ensuring that their organization's network security complies with regulatory and industry standards in risk compliance. Companies are under considerable pressure to protect customer information, customer privacy, and sensitive business information against threats from cyber criminals, competitors, and network hackers. For example, business partners may demand increasingly tight compliance in implementing and enforcing IT policies, processes, and controls around key assets and sensitive information. Effective risk management may entail accurate and comprehensive visibility into a company's assets and business processes. Such visibility may include detailed information on vulnerabilities (e.g., operating system or application exploitable flaws) in the network.

Currently available risk management software programs can maintain an up-to-date database of vulnerabilities, detect vulnerabilities, perform trend analyses and provide reports of the results. While scripts according to such currently available risk management software programs can be filtered for specific vulnerabilities (e.g., filtered by operating system, asset criticality, severity of a vulnerability found on the asset, etc.), the filtering process is manual, which may be prone to human error. For example, such risk management software programs are typically manually operated, with IT administrators manually populating scripts to run.

Scanners available today scan for vulnerabilities on an asset by running scripts against it for one or more of the vulnerabilities. The list of these scripts have grown from few thousands to upwards of 30,000 (commensurate with an expansive and ever-increasing list of known vulnerabilities) and continues to grow. When an asset is scanned, all scripts are run against that asset. Exponential growth in scripts/vulnerabilities and assets have slowed scans down. Customers run daily scans to identify new vulnerabilities on the same set of assets. Current implementation runs all selected scripts on all selected assets even when the previous scan found certain vulnerabilities are not on that asset or not relevant to it. With the exponential growth of assets and vulnerabilities, scanning for all vulnerabilities on every asset each day has become a major performance and resource issue. The performance impact can be observed not just on scanners but also on the assets. The ratio between time and scan volume makes it nearly impossible to do daily scans with reasonable resources. Optimizing scripts, resources and scan engines may not be enough to improve the performance of the scans.

System 10 outlined by FIG. 1 can resolve many of these issues. According to an embodiment of the present disclosure, when an asset is scanned for the first time, all the scripts against it may be run to check for all vulnerabilities in vulnerability set 26. Subsequent daily scans may only run scripts that identified vulnerabilities (i.e., "known vulnerabilities") and/or that did not run on the asset when full scan was run (i.e., new vulnerabilities). The scripts for the new vulnerabilities may include new scripts developed between an immediately previous scan and the current scan. This may enable customers to identify remediated and new vulnerabilities in an optimized manner (e.g., reduced time and resources).

According to embodiments of system 10, when an asset is scanned, results including known vulnerabilities are saved to results database 38. During daily scans, scanning for the known vulnerabilities to the exclusion of vulnerabilities that are already determined to be not vulnerable or not relevant may improve scan performance tremendously. For example, it may produce expected or otherwise satisfactory results in a much shorter time than a full scan. Also for every few such "smart scans," a full scan can be scheduled periodically to reiterate the entire health of system 10. For instance, assets can add new applications, updates, countermeasures, etc., as well as other configuration changes making a previous "full" scans obsolete. In some instances, a periodic full scan can supplement daily smart scans based on an identified change to configuration of an asset (e.g., the addition of a particular application, operating system patch, network connection, etc.). In other instances, a full scan can be performed based on an identification that a particular asset is available for a full scan (e.g., the asset is identified as being present on a particular network), performed according to a particular schedule (e.g., at least one full scan per month), or according to some other criteria, schedule, or condition. Providing both daily or more regular smart scans supplemented by less frequent full scans can give customers a guarantee on the health of an asset while determining new issues exceptionally faster.

Smart scans according to embodiments of system 10 could intelligently reduce the number of scripts that are required to check for vulnerabilities in vulnerability set 36 by taking the results of prior scans into consideration. When a scan is repeated by scanning for known vulnerabilities to the exclusion of vulnerabilities that do not exist on the asset, the scan performance may be improved greatly. Smart scans can be repeated until a certain time threshold expires and then a full scan can be performed to improve confidence in the scan. Such an operation may vastly improve time taken per repeated scan, number of scans that can be run in parallel, and resource usage.

In accordance with one example embodiment of system 10, a method is provided to intelligently choose vulnerabilities to scan in assets 18A-E. According to one embodiment of system 10, vulnerability manager 20 may identify known vulnerabilities and new vulnerabilities in an asset (e.g., asset 18A). Vulnerability manager 20 may select one or more scripts to check for the known vulnerabilities and the new vulnerabilities and cause scan engine 14 to scan the asset. According to another embodiment of system 10, a plurality of assets in a network (e.g., network 40A) may be scanned to check for known vulnerabilities and new vulnerabilities on all assets in the network based on previous scan results.

Thus, the scripts may disregard vulnerabilities that are known not to exist in the assets, or are irrelevant to the assets. Generally, an asset that does not have a specific vulnerability for a variety of reasons (e.g., it does not have the operating system associated with the vulnerability; a software patch to remedy the vulnerability has already been installed on the asset, etc.) may not suddenly become prone to that specific vulnerability, barring exceptional circumstances. In the vast majority of situations where assets are scanned for vulnerabilities, assets that have been identified as not having a specific vulnerability need not be scanned again for that specific vulnerability. Embodiments of system 10 take advantage of such properties to optimize scan performance, for example, by scanning for vulnerabilities that are known to exist (e.g., to check whether the vulnerability has been remedied), and for new vulnerabilities (e.g., to check whether they exist), while disregarding vulnerabilities that are known not to exist in the asset being scanned.

Vulnerability manager 20 can discover and aid in scanning assets 18A-E on network 12, including dynamic/portable assets (e.g., mobile devices, laptops, notepads, smart-phones, etc.) and static assets (e.g., e.g., desktops, printers, etc.). The breadth and depth of scanning by vulnerability manager 20 can permit users 16 to pinpoint vulnerabilities in network 12 in an optimized manner, for example, with reduced scan times. Vulnerability manager 20 can automatically discover, assess, and report vulnerabilities in selected assets (e.g., particular assets, or particular networks) in network 12. Vulnerability manager 20 can permit users 16 to monitor progress of the one or more scan engines 14, remotely or locally connected to a scanner, and manage the scanning and reporting process from a single console for a consolidated view of the vulnerability status of network 12.

Turning to the infrastructure of FIG. 1, the example network environment may be configured as one or more networks and may be configured in any form including, but not limited to, local area networks (LANs), wireless local area networks (WLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, a communication link may represent a remote connection (e.g., a remote connection to scan engine 14) through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In addition, gateways, routers, switches, and any other suitable network elements may be used to facilitate electronic communication between systems, users 16 and scan engine 14. Note that the network illustrated in FIG. 1, may include a configuration capable of transmission control protocol/internet protocol (TCP/IP) communications for the transmission and/or reception of packets in the network. The network could also operate in conjunction with a user datagram protocol/IP (UDP/IP) or any other suitable protocol, where appropriate and based on particular needs. Only a few assets and networks are illustrated in FIG. 1, for ease of description. Any number of assets and networks may be included in system 10 within the broad scope of the present disclosure.

Using processor 32, memory element 34, and appropriately configured GUI 30, vulnerability manager 20 can permit users 16 to scan assets 18A-E in an optimized manner (e.g., reduced time, reduced resources, etc.). In an example embodiment, GUI 30 may be configured to permit users 16 to select a scan option from a drop down menu that displays a choice between a "smart scan" and a "full scan." The "smart scan" option may trigger a further drop-down menu (or other appropriate selection configuration) to permit the user to scan selected networks, or alternatively, selected assets. The full scan option may cause scans to be run on assets 18A-E that check for substantially all vulnerabilities in vulnerability sets 36.

Vulnerability manager 20 may be implemented on a physical or virtualized hardware connected to network 12, or may be implemented on specialized devices configured to scan networks or assets. Not shown in system 10 of FIG. 1 is hardware that may be suitably coupled to vulnerability manager 20 in the form of consoles, user interfaces, processors, memory elements, memory management units (MMU), additional symmetric multiprocessing (SMP) elements, peripheral component interconnect (PCI) bus and corresponding bridges, small computer system interface (SCSI)/integrated drive electronics (IDE) elements, etc. In addition, suitable modems and/or network adapters may also be included for allowing network access. Any suitable operating systems may also be configured in vulnerability manager 20 to appropriately manage the operation of hardware components therein. Vulnerability manager 20 may include any other suitable hardware, software, components, modules, interfaces, or objects that facilitate the operations thereof. This may be inclusive of appropriate algorithms and communication protocols that facilitate the operations detailed herein.

Figure 2:
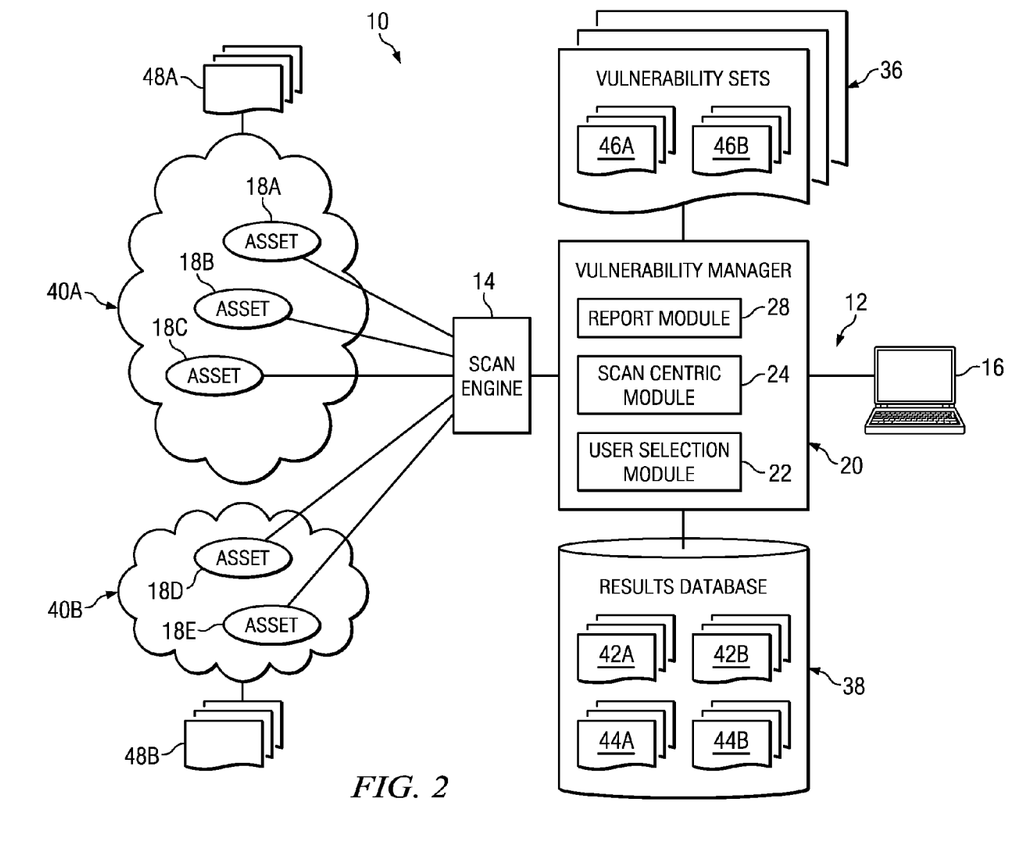
FIG. 2 is a simplified block diagram of another embodiment of the system.

Turning to FIG. 2, FIG. 2 is a simplified block diagram illustrating an embodiment of system 10. Networks 40A and 40B in system 10 may be associated with known vulnerabilities 42A and 42B, respectively. Vulnerabilities in each of known vulnerabilities 42A and 42B may overlap (e.g., vulnerabilities associated with the operating system may be common to all assets having that operating system) or alternatively, they may be unique to the assets they are respectively associated with (e.g., vulnerabilities associated with unique applications installed on the assets, or unique files stored on the assets, or unique functions of the assets may be different between the different assets). Known vulnerabilities 42A and 42B may be determined by any means, for example, from results of previous scans on assets 18A-E, or from manufacturers of software and applications on assets 18A-E, or from independent third party databases. Known vulnerabilities 42A and 42B may be stored in results database 38. Results database 38 may also contain sets of scanned vulnerabilities 44A and 44B, associated with assets in network 40A and 40B, respectively. Further, networks 40A and 40B may also be associated with respective sets of new vulnerabilities 46A and 46B. New vulnerabilities 46A and 46B may be determined to include vulnerabilities in vulnerability set 36 that are not included in scanned vulnerabilities sets 44A and 44B, respectively.

According to an embodiment of the present disclosure, when a user elects to scan a selected network (e.g., network 40A), scan centric module 24 may be triggered. Scan centric module 24 may permit the user to identify the network to be scanned. For example, the network may be identified by a range of IP addresses of assets on the network. In another example, the network may be identified by a name (e.g., "WORKGROUP"), or other identifier (e.g., network ID). In yet another example, the network may be identified based on location (e.g., corporate intranet located in Plano, Tex.). Various options exist to identify networks, and any and all such options may be used without departing from the broad scope of the present disclosure.

Assume, for the sake of illustration, that user 16 selects network 40A for scanning. Scan centric module 24 may identify each asset 18A-C on network 40A. For example, assets 18A-C may be identified by the corresponding IP addresses. Other options for identifying assets (e.g., by asset name, or asset ID, etc.) may be used within the broad scope of the present disclosure. For each asset 18A-C, scan centric module 24 may access results of previous scans from results database 38. In an example embodiment, scan centric module 24 may run a query in results database 38 to determine all scanned vulnerabilities and known vulnerabilities for each asset 18A-C. Known vulnerabilities 42A may be determined as a union of known vulnerabilities of individual assets 18A, 18B and 18C. Scanned vulnerabilities 44A may likewise be determined as a union of scanned vulnerabilities of individual assets 18A, 18B, and 18C.

Scan centric module 24 may compare scanned vulnerabilities 44A with vulnerabilities set 36 (denoted by set U) to determine new vulnerabilities 46A that have not been previously checked in any of assets 18A-C in network 40A:

$$46A = U \setminus 44A = \{x : x \in U | x \notin 44A\}$$

Any vulnerability in new vulnerabilities 46A may belong to vulnerabilities set 36, but may not belong to scanned vulnerabilities 44A. Scan centric module 24 may determine a network vulnerability set 48A, comprising a list of vulnerabilities to be checked in network 40A, for example, according to the following equation:

$$44A = 42A \cup 46A = \{x : x \in 42 \text{ or } x \in 46A\}$$

Network vulnerability set 44A may be determined by the union of known vulnerabilities 42A, and new vulnerabilities 46A. Thus, any vulnerability x in network vulnerability set 44A may be included in known vulnerabilities 42A or new vulnerabilities 46A.

In one illustrative example, provided merely for the sake of description and not as a limitation, the total number of vulnerabilities in vulnerability set 36 is 30,000; the number of known vulnerabilities in asset 18A is 2; the number of known vulnerabilities in asset 18B is 2,000; the number of known vulnerabilities in asset 18C is 100; and that the number of new vulnerabilities 46A is 100. If none of the vulnerabilities overlap, the total number of vulnerabilities in a corresponding example network vulnerability set 44A may be (2+2000+100)+100=2,202. Thus, instead of testing for all 30,000 vulnerabilities in this example, scan centric module 24 may test only for 2,202 of those vulnerabilities in network 40A. Scan centric module 24 may disregard scanned vulnerabilities that have been previously identified to not exist in assets 18A-C (e.g., through previously-performed full scans). If the known vulnerabilities in assets 18A-C overlap, the number of vulnerabilities in network vulnerability set 44A may be further reduced. Scan centric module 24 may select one or more scripts for one or more of assets 18A-C to check for the vulnerabilities in network vulnerability set 44A.

Similarly, if user 16 selects network 40B for scanning, scan centric module 24 may identify each asset 18D-E on network 40B. In an example embodiment, scan centric module 24 may run a query in results database 38 to determine all scanned vulnerabilities and known vulnerabilities for which each asset 18D and 18E. Known vulnerabilities 42B may be determined as a union of known vulnerabilities of individual assets 18D and 18E. Scanned vulnerabilities 44B may likewise be determined as a union of scanned vulnerabilities of individual assets 18D and 18E.

Scan centric module 24 may compare scanned vulnerabilities 44B with vulnerabilities set 36 (denoted by set U) to determine new vulnerabilities 46B that have not been previously checked in any of assets 18D and 18E in network 40B:

$$46B = U \setminus 44B = \{x : x \in U | x \notin 44B\}$$

Any vulnerability in new vulnerabilities 46B may belong to vulnerabilities set 36, but may not belong to scanned vulnerabilities 44B. Scan centric module 24 may determine a network vulnerability set 48B, comprising a list of vulnerabilities to be checked in network 40B, for example, according to the following equation:

$$44B = 42B \cup 46B = \{x : x \in 42B \text{ or } x \in 46B\}$$

Network vulnerability set 44B may be determined by the union of known vulnerabilities 42B, and new vulnerabilities 46B. Thus, any vulnerability x in network vulnerability set 44B may be included in known vulnerabilities 42B or new vulnerabilities 46B.

In another illustrative example, again presented merely for the sake of description and not as a limitation, the number of vulnerabilities in vulnerability sets 36 is 30,000; the number of known vulnerabilities in asset 18D is 50; the number of known vulnerabilities in asset 18E is 10,000; and the number of new vulnerabilities 46B is 50. If none of the vulnerabilities overlap, the total number of vulnerabilities in network vulnerability set 44B may be (50+10,000)+50=10,100. Thus, instead of testing for all 30,000 vulnerabilities, scan centric module 24 may test only for 10,100 of those vulnerabilities in network 40B. If the known vulnerabilities in assets 18D-E overlap, the number of vulnerabilities in network vulnerability set 44B may be further reduced. Scan centric module 24 may select one or more scripts for one or more of assets 18D-E to check for the vulnerabilities in network vulnerability set 44B.

Figure 3:
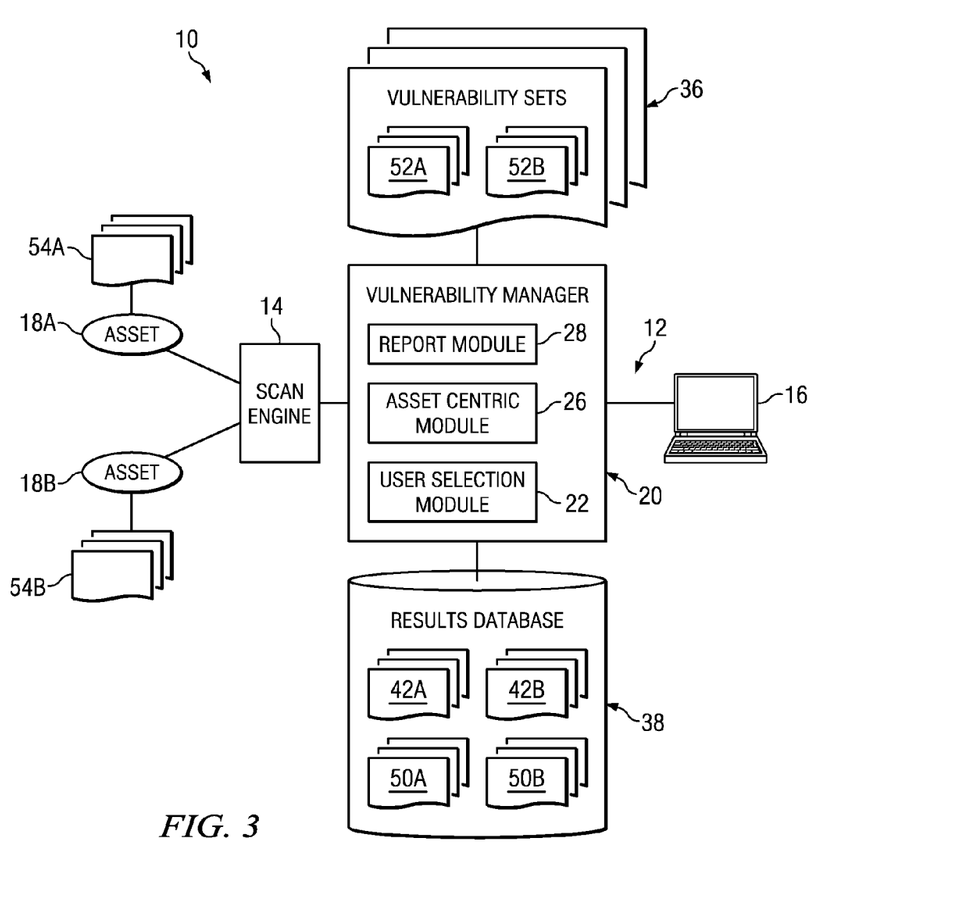
FIG. 3 is a simplified block diagram of yet another embodiment of the system.

Turning to FIG. 3, FIG. 3 is a simplified block diagram illustrating an example embodiment of system 10. Assume, merely for the sake of illustration, that system 10 comprises two assets 18A and 18B, associated with known vulnerabilities 42A and 42B, respectively. Any number of assets may be provided in system 10 within the broad scope of the present disclosure. As previously discussed, vulnerabilities in each of known vulnerabilities 42A and 42B may overlap or, alternatively, be unique to the assets they are respectively associated with. Known vulnerabilities 42A and 42B may be stored in results database 38, and determined, for example, from results of previous scans run on assets 18A and 18B and using other techniques. Results database 38 may also contain scanned vulnerabilities 50A and 50B, associated with respective assets 18A and 18B.

According to an embodiment of the present disclosure, when a user elects to scan a selected asset (e.g., asset 18A), asset centric module 26 may be triggered. Asset centric module 26 may provide user 16 with an option to identify the asset. For example, the asset may be identified by an IP address. In another example, the asset may be identified by a name (e.g., "Joe's Computer"), or other identifier (e.g., asset ID). In yet another example, the asset may be identified based on location (e.g., cubicle 20 in Building 2). Various options exist to identify assets, and any and all such options may be used without departing from the broad scope of the present disclosure.

Assume, for the sake of description, that user 16 selects asset 18A for scanning. Asset centric module 26 may access results of previous scans on asset 18A from results database 38. In an example embodiment, asset centric module may run a query in results database 38 to determine scanned vulnerabilities 50A and known vulnerabilities 42A in asset 18A. Asset centric module 26 may compare scanned vulnerabilities 50A with vulnerabilities set 36 (denoted by set U) to determine new vulnerabilities 52A that have not been previously checked in asset 18A:

$$52A = U \setminus 50A = \{x : x \in U | x \notin 50A\}$$

Any vulnerability in new vulnerabilities 52A may belong to vulnerabilities set 36, but may not belong to scanned vulnerabilities 50A. Asset centric module 26 may determine an asset vulnerability set 54A, comprising a list of vulnerabilities to be checked in asset 18A, for example, according to the following equation:

$$54A = 42A \cup 52A = \{x : x \in 42A \text{ or } x \in 52A\}$$

Asset vulnerability set 54A may be determined by the union of substantially all known vulnerabilities 42A in asset 18A, and new vulnerabilities 52A. Thus, any vulnerability x in asset vulnerability set 54A may be included in known vulnerabilities 42A, or new vulnerabilities 52A.

In another illustrative example, again provided merely for the sake of description and not as a limitation, the total number of vulnerabilities in vulnerability set 36 is 30,000; the number of vulnerabilities in known vulnerabilities 42A is 2; and the number of new vulnerabilities 52A is 20. Thus, the total number of vulnerabilities in asset vulnerability set 54A may be 2+20=22. Thus, instead of testing for all 30,000 vulnerabilities, asset centric module 26 may test only for 22 of those vulnerabilities in asset 18A. Asset centric module 26 may generate a scan program for asset 18A comprising a selection of scripts to check for the vulnerabilities in asset vulnerability set 54A.

Similarly, if user 16 selects asset 18B for scanning, asset centric module 26 may access results of previous scans on asset 18B from results database 38. Asset centric module 26 may compare scanned vulnerabilities 50B with vulnerabilities set 36 to determine new vulnerabilities 52B:

$$52B = U \setminus 50B = \{x : x \in U | x \notin 50B\}$$

Any vulnerability in new vulnerabilities 52B may belong to vulnerabilities set 36, but may not belong to scanned vulnerabilities 50B. Asset centric module 26 may determine an asset vulnerability set 54B, comprising a list of vulnerabilities to be checked in asset 18B, for example, according to the following equation:

$$54B = 42B \cup 52B = \{x : x \in 42B \text{ or } x \in 52B\}$$

Asset vulnerability set 54B may be determined by the union of substantially all known vulnerabilities 42B in asset 18B, and new vulnerabilities 52B. Thus, any vulnerability x in asset vulnerability set 54B may be included in known vulnerabilities 42B, or new vulnerabilities 52B.

In another illustrative example, again provided merely for the sake of description and not as a limitation, the total number of vulnerabilities in vulnerability set 36 is 30,000; the number of vulnerabilities in known vulnerabilities 42B is 2000; and the number of new vulnerabilities 52B is 100. Thus, the total number of vulnerabilities in asset vulnerability set 50B may be 2000+100=2,100. Thus, instead of testing for all 30,000 vulnerabilities, asset centric module 26 may test only for 2,100 of those vulnerabilities in asset 18B. Asset centric module 26 may generate a scan program for asset 18B comprising a selection of scripts to check for the vulnerabilities in asset vulnerability set 54B.

Figure 4A:
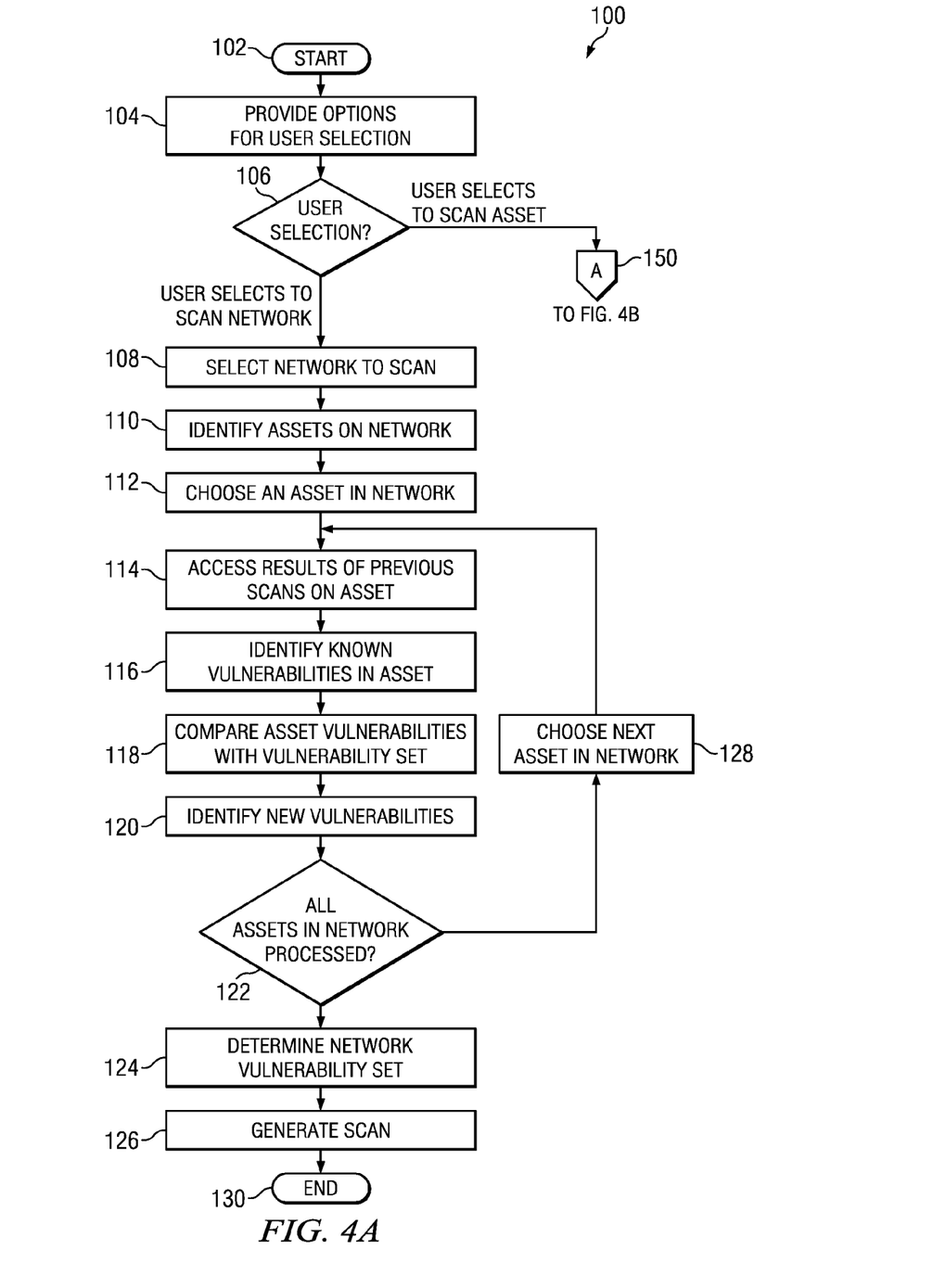
FIG. 4A is a simplified flow-chart illustrating example operational steps that may be associated with embodiments of the present disclosure.
Figure 4B:
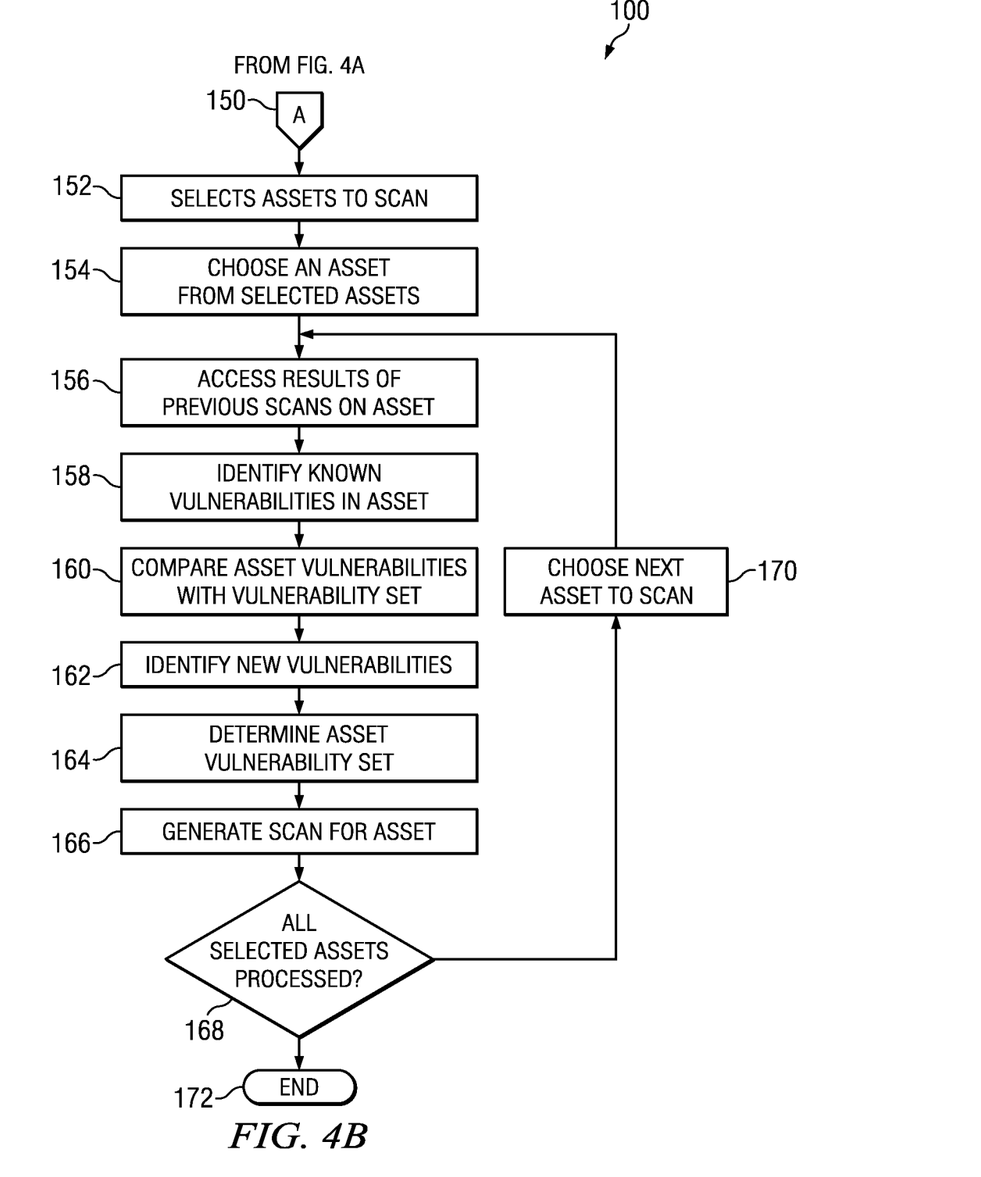
FIG. 4B is a simplified flow-chart illustrating other example operational steps that may be associated with embodiments of the present disclosure.

Turning to FIGS. 4A and 4B, FIG. 4A is a simplified flow-chart illustrating example operational steps that may be associated with embodiments of system 10. According to an embodiment of the present disclosure, given a set of assets and/or addresses on a network and a set of vulnerability checks, a set of substantially all vulnerabilities previously discovered in the entire scan across all assets and addresses may be retrieved, any newly released vulnerability checks may be added, and then substantially every asset and address for that union of vulnerabilities may be rescanned. Operations 100 start at 102, when vulnerability manager 20 is activated. At 104, vulnerability manager 20 may provide options for user selection. For example, the options may be provided in a drop down menu format in GUI 30. The drop down menu may indicate that the user can select to scan a network, or alternatively, scan one or more specific assets. At 106, the user's selection may be identified. If the user selects to scan a network, the operations step to 108, where scan centric module 24 provides options to the user to select a network. For example, the user may select a range of IP addresses to scan. At 110, scan centric module 24 may identify assets on the selected network.

At 112, scan centric module 24 may choose an asset in the selected network. At 114, scan centric module 24 may access results of previous scans on that asset from results database 38. At 116, scan centric module 24 may determine known vulnerabilities in that asset. At 118, scan centric module 24 may compare scanned vulnerabilities in that asset with vulnerability sets 36. At 120, scan centric module 24 may identify new vulnerabilities, which are vulnerabilities in the vulnerability sets 36 that are not included in the scanned vulnerabilities.

At 122, scan centric module 24 checks whether all assets in the selected network have been processed. Note that in some embodiments, if a new asset is discovered which has not previously been scanned, then that asset may be scanned with all vulnerability checks selected in the scan. If all assets have been processed, scan centric module 24 determines network vulnerability set, comprising a union of known vulnerabilities and new vulnerabilities. At 126, scan centric module 24 generates an appropriate scan program, comprising a selection of scripts to check for the network vulnerability set previously determined. If all assets in the selected network have not been processed, the operations step to 128, where the next asset in the selected network is chosen for processing. Operations 114 to 122 repeat thereafter. The process ends at 130, where the generated selection of scripts is provided to scan engine 14.

On the other hand, if the user selects to scan assets at step 106, the operations step to 150, where asset centric module 26 is activated. Turning to FIG. 4B, a portion of flow-chart 100 is illustrated showing example operational steps that may be associated with embodiments of system 10 related to operations of asset centric module 26. According to an embodiment of the present disclosure, given a set of assets and/or addresses on a network and a set of vulnerability checks, for each individual asset or address, the set of vulnerabilities previously discovered on that asset or address may be retrieved, any newly released vulnerability checks may be added, and then the asset may be scanned for just those vulnerabilities, repeating for every asset and address in the scan. At 152, asset centric module provides the user with a selection menu permitting the user to select one or more assets to scan. At 154, asset centric module 26 may choose an asset from the selected assets for processing. At 156, asset centric module 26 may access results of previous scans on the asset from results database 38. At 158, asset centric module 26 may identify known vulnerabilities in the asset. At 160, asset centric module 26 may compare the scanned vulnerabilities with vulnerability sets 36. At 162, asset centric module 26 may identify new vulnerabilities, which are vulnerabilities in the vulnerability sets 36 that are not included in the scanned vulnerabilities. At 164, asset centric module 26 may determine the asset vulnerability set for the asset. At 166, asset centric module 26 may generate a scan program, comprising a selection of scripts to check for the vulnerabilities previously determined at step 164. At 168, asset centric module 26 may determine if all selected assets have been processed. Note that in some embodiments, if a new asset is discovered which has not previously been scanned, then that asset may be scanned with all vulnerability checks selected in the scan. If all selected assets have not been processed, the operations step to 170, where a next asset to scan may be chosen. Otherwise, the operations end at 172.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

The options, as shown in the FIGURES herein, are for example purposes only. It will be appreciated that numerous other options, at least some of which are detailed herein in this Specification, may be provided in any combination with or exclusive of the options of the various FIGURES. Software for achieving the operations outlined herein can be provided at various locations (e.g., the corporate IT headquarters, end user computers, distributed servers in the cloud, etc.). In some embodiments, this software could be received or downloaded from a web server (e.g., in the context of purchasing individual end-user licenses for separate networks, devices, servers, etc.) in order to provide this system. In one example embodiment, this software is resident in one or more computers and/or web hosts sought to be protected from a security attack (or protected from unwanted or unauthorized manipulations of data).

In various embodiments, the software of system 10 could involve a proprietary element (e.g., as part of a network security solution with McAfee® Vulnerability Manager (MVM) software, McAfee® ePolicy Orchestrator (ePO) software, etc.), which could be provided in (or be proximate to) these identified elements, or be provided in any other device, server, network appliance, console, firewall, switch, information technology (IT) device, distributed server, etc., or be provided as a complementary solution, or otherwise provisioned in the network.

In certain example embodiments, the activities as outlined herein may be implemented in software. This could be inclusive of software provided in vulnerability manager 20 and in other network elements (e.g., scan engine 14). These elements and/or modules can cooperate with each other in order to perform the activities related to grouping computer vulnerabilities as discussed herein. In other embodiments, these features may be provided external to these elements, included in other devices to achieve these intended functionalities, or consolidated in any appropriate manner. For example, some of the processors associated with the various elements may be removed, or otherwise consolidated such that a single processor and a single memory location are responsible for certain activities. In a general sense, the arrangement depicted in FIGURES may be more logical in its representation, whereas a physical architecture may include various permutations, combinations, and/or hybrids of these elements.

In various embodiments, some or all of these elements include software (or reciprocating software) that can coordinate, manage, or otherwise cooperate in order to achieve the operations as outlined herein. One or more of these elements may include any suitable algorithms, hardware, software, components, modules, interfaces, or objects that facilitate the operations thereof. In the embodiment involving software, such a configuration may be inclusive of logic encoded in one or more tangible media, which may be inclusive of non-transitory media (e.g., embedded logic provided in an application specific integrated circuit (ASIC), digital signal processor (DSP) instructions, software (potentially inclusive of object code and source code) to be executed by a processor, or other similar machine, etc.).

In some of these instances, one or more memory elements (e.g., memory element 34) can store data used for executing the operations described herein. This includes the memory element being able to store software, logic, code, or processor instructions that are executed to carry out the activities described in this Specification. A processor can execute any type of instructions associated with the data to achieve the operations detailed herein in this Specification. In one example, processor 32 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

System 10 and other associated components in system 10 can include one or more memory elements (e.g., memory element 34) for storing information as outlined herein. Information may be kept in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 10 (e.g., vulnerability sets 36, known vulnerabilities 42A-E, reports, etc.) could be provided in any database, register, table, cache, queue, control list, or storage structure, based on particular needs and embodiments, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.' Each of the computers may also include suitable interfaces for receiving, transmitting, and/or otherwise communicating data or information in a network environment.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system of FIGURES (and corresponding teachings) is readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

What is claimed is:

1. A method comprising:
    identifying, using at least one data processing apparatus, a plurality of assets to scan in a network;
    identifying, using at least one data processing apparatus, a plurality of sets of known vulnerabilities in the plurality of assets, wherein identifying the plurality of sets of known vulnerabilities comprises identifying, for two or more of the plurality of assets, a respective set of known vulnerabilities previously detected as being present on the asset;
    identifying, using at least one data processing apparatus, a plurality of sets of new vulnerabilities in the plurality of assets, wherein identifying the plurality of sets of new vulnerabilities comprises identifying, for two or more of the plurality of assets, a respective set of new vulnerabilities for which the asset has not yet been scanned;
    selecting, using at least one data processing apparatus, a set of scripts comprising checks for particular vulnerabilities included in a union of the plurality of sets of known vulnerabilities and the plurality of sets of new vulnerabilities; and
    using the selected scripts to scan the plurality of assets for vulnerabilities.

2. The method of claim 1, wherein vulnerabilities that have been previously tested and known not to exist in the asset are not included in the selected scripts.

3. The method of claim 1, wherein identifying the set of known vulnerabilities comprises:
    accessing results of previous scans on the asset, wherein the results indicate the known vulnerabilities.

4. The method of claim 1, wherein identifying the set of new vulnerabilities comprises:
    accessing results of previous scans on the asset, wherein the results indicate a set of scanned vulnerabilities; and
    determining vulnerabilities included in a universal set of vulnerabilities in a computer system that are not in the set of scanned vulnerabilities.

5. The method of claim 1, further comprising:
    storing results of the scan in a results database.

6. The method of claim 1, further comprising: using the selected scripts to scan substantially all assets in the plurality of assets.

7. The method of claim 1, wherein the plurality of assets is identified by a range of Internet Protocol (IP) addresses.

8. The method of claim 1, wherein each vulnerability comprises a respective asset attribute that potentially enables at least one of a security breach and a policy violation.

9. An apparatus comprising:
    a memory element configured to store data; and
    a processor operable to execute instructions associated with the data, wherein the apparatus is configured for:
        identifying a plurality of assets to scan in a network;
        identifying a plurality of sets of known vulnerabilities in the plurality of assets, wherein identifying the plurality of sets of known vulnerabilities comprises identifying, for two or more of the plurality of assets, a respective set of known vulnerabilities previously detected as being present on the asset;
        identifying a plurality of sets of new vulnerabilities in the plurality of assets, wherein identifying the plurality of sets of new vulnerabilities comprises identifying, for two or more of the plurality of assets, a respective set of new vulnerabilities for which the asset has not yet been scanned;
        selecting a set of scripts comprising checks for particular vulnerabilities included in a union of the plurality of sets of known vulnerabilities and the plurality of sets of new vulnerabilities; and
        using the selected scripts to scan the plurality of assets.

10. The apparatus of claim 9, wherein identifying the set of known vulnerabilities comprises:
    accessing results of previous scans on the asset, wherein the results indicate the known vulnerabilities.

11. The apparatus of claim 9, wherein identifying the set of new vulnerabilities comprises:
    accessing results of previous scans on the asset, wherein the results indicate a set of scanned vulnerabilities; and
    determining vulnerabilities included in a universal set of vulnerabilities in a computer system that are not in the set of scanned vulnerabilities.

12. The apparatus of claim 9, wherein the apparatus is further configured for:

storing results of the scan in a results database.

13. The apparatus of claim 9, further comprising: using the selected scripts to scan substantially all assets in the plurality of assets.

14. At least one non-transitory, machine accessible storage medium having instructions stored thereon, the instructions when executed on a machine, cause the machine to:

identify a plurality of assets to scan in a network;

identify a plurality of sets of known vulnerabilities in the plurality of assets, wherein the instructions when executed, cause the machine to identify, for two or more of the plurality of assets, a respective set of known vulnerabilities previously detected as being present on an asset;

identify a plurality of sets of new vulnerabilities in the plurality of assets, wherein the instructions when executed, cause the machine to identify, for two or more of the plurality of assets, a respective set of new vulnerabilities for which the asset has not yet been scanned;

select a set of scripts comprising checks for vulnerabilities included in a union of the plurality of sets of known vulnerabilities and the plurality of sets of new vulnerabilities; and use the selected scripts to scan the plurality of assets.

15. The storage medium of claim 14, wherein identifying the set of known vulnerabilities comprises:

accessing results of previous scans on the asset, wherein the results indicate the known vulnerabilities.

16. The storage medium of claim 14, wherein identifying the set of new vulnerabilities comprises:

accessing results of previous scans on the asset, wherein the results indicate a set of scanned vulnerabilities; and determining vulnerabilities included in a universal set of vulnerabilities in a computer system that are not in the set of scanned vulnerabilities.

17. The storage medium of claim 14, wherein the instructions, when executed, further cause the machine to:

store results of the scan in a results database.

18. The storage medium of claim 14, wherein the instructions, when executed, further cause the machine to:

use the selected scripts to scan substantially all assets in the plurality of assets.

* * * * *